(12) United States Patent
Tanaka et al.

(10) Patent No.: US 7,128,480 B2
(45) Date of Patent: Oct. 31, 2006

(54) LENS BARREL AND CAMERA HAVING THE SAME

(75) Inventors: Tadanori Tanaka, Kokubunji (JP); Yoshihiro Yokomae, Higashiyamato (JP)

(73) Assignee: Olympus Corporation, Tokyo (JP)

( * ) Notice: Subject to any disclaimer, the term of this patent is extended or adjusted under 35 U.S.C. 154(b) by 163 days.

(21) Appl. No.: 11/005,809

(22) Filed: Dec. 7, 2004

(65) Prior Publication Data
US 2005/0135799 A1 Jun. 23, 2005

(30) Foreign Application Priority Data
Dec. 10, 2003 (JP) ............................. 2003-412611

(51) Int. Cl.
*G03B 11/04* (2006.01)
(52) U.S. Cl. ..................................................... 396/448
(58) Field of Classification Search ................ 396/448; 359/511
See application file for complete search history.

(56) References Cited

U.S. PATENT DOCUMENTS 4,864,338 A * 9/1989 Wakabayashi .............. 396/349
5,614,973 A * 3/1997 Azegami ..................... 396/448
5,761,556 A 6/1998 Ichino ........................ 396/349
6,164,842 A * 12/2000 Ohta et al. .................. 396/349
6,520,691 B1 * 2/2003 Nomura et al. ............. 396/448
6,988,837 B1 * 1/2006 Ichino ........................ 396/448

FOREIGN PATENT DOCUMENTS

| JP | 07-020369 | 1/1995 |
| JP | 07-020536 | 1/1995 |
| JP | 07-159855 | 6/1995 |

* cited by examiner

*Primary Examiner*—W. B. Perkey
(74) *Attorney, Agent, or Firm*—Volpe and Koenig, P.C.

(57) ABSTRACT

A lens barrel comprises a first frame including an inward flange having an opening as a light path for a photographic optical system, a barrier-driving member disposed in the vicinity of the opening, a second frame disposed inside the first frame and movable along an optical axis relative to the first frame, a barrier blade movable along with the rotation of the barrier-driving member between a closed position in which the barrier blade blocks at least a part of the light path and an open position in which the barrier blade is retracted from the light path, an opening-urging member capable of urging the barrier blade towards the open position and urging the barrier-driving member towards a first direction, and a closing-urging member capable of urging the barrier blade toward the closed position.

20 Claims, 8 Drawing Sheets

LENS BARREL AND CAMERA HAVING THE SAME

This application claims benefit of Japanese Application No. 2003-412611 filed in Japan on Dec. 10, 2003, the contents of which are incorporated by this reference.

BACKGROUND OF THE INVENTION

1. Field of the Invention

The present invention relates to a lens barrel and a camera, and, more specifically, the invention relates to a lens barrel having a barrier mechanism for moving to a closed position and an open position. In the closed position, the front face of a photographic lens is covered with a barrier, and, in the open position, the front face of the photographic lens is exposed.

2. Description of the Related Art

A known pair of lens barrier blades for a camera is disposed inside a photographic lens barrel (hereinafter referred to as a 'lens barrel') in the front portion of the camera. When a photograph is not being taken, the barrier blades are in a closed position in which the barrier blades cover the front portion of the photographic lens. When a photograph is being taken, the barrier blades move to an open position in which the barrier blades are moved away from the front of the photographic lens to allow a luminous flux to enter the photographic lens. Various known driving mechanisms for opening and closing the barrier blades are proposed.

For example, Japanese Patent Application Laid-Open No. 7-159855 discloses a mechanism for opening and closing barrier blades in which the barrier blades are opened and closed by rotating a barrier opening/closing ring, disposed on the distal end portion of the lens barrel, around an optical axis.

More specifically, a cam plate having a cam surface at its distal end is disposed inside a camera body including the lens barrel, wherein the cam plate extends into the lens barrel when the lens barrel is retracted to the camera. Arms extending into the lens barrel are provided on the barrier opening/closing ring. In this barrier opening and closing mechanism, the barrier blades move to the closed position when the lens barrel is retracted to the camera body and the barrier opening/closing ring rotates around the optical axis as the tip of the arms engage with the cam plate.

Another mechanism for opening and closing barrier blades is disclosed in Japanese Patent Application Laid-Open No. 7-20369. In this mechanism for opening and closing the barrier blades, a barrier driving ring rotatable around an optical axis is disposed at the front portion of a lens barrel. This barrier driving ring is, for example, rotated around the optical axis by, for example, a motor driving mechanism.

More specifically, at the distal end of the lens barrel, the barrier driving ring and a barrier driving gear with one end extending into the lens barrel are disposed. Inside the lens barrel, the motor driving mechanism is disposed. In such a mechanism for opening and closing a barrier, the barrier blades are opened and closed by rotating the barrier driving ring. To rotate the barrier driving ring, the barrier driving ring is connected to the barrier driving gear and then the barrier driving gear is connected to the motor driving mechanism.

SUMMARY OF THE INVENTION

A lens barrel according to the present invention comprises: a first frame including an inward flange having a central opening as a light path for a photographic optical system; a barrier-driving member disposed in the vicinity of the opening of the inward flange, the barrier-driving member being rotatable around an axis parallel with an optical axis of the photographic optical system; a second frame disposed inside the first frame and movable along the optical axis of the photographic optical system relative to the first frame, the second frame having a pressing part capable of pressing the barrier-driving member when the second frame moves relative to the first frame; a barrier blade movable along with the rotation of the barrier-driving member to a closed position in which the barrier blade blocks at least a part of the light path of the photographic optical system and an open position in which the barrier blade is retracted from the light path of the photographic optical system; an opening-urging member disposed on the barrier-driving member, the opening-urging member being capable of urging the barrier blade towards the open position and urging the barrier-driving member towards a first direction; a closing-urging member disposed in the vicinity of the opening of the inward flange, the closing-urging member urging the barrier blade toward the closed position; wherein the barrier-driving member rotates in a second direction opposite to the first direction against the urging force of the opening-urging member as the pressing part presses the barrier-driving member, the barrier blade moves from the open position to the closed position by the urging force of the closing-urging member as the pressing part presses the barrier-driving member, and, as the pressing part separates from the barrier-driving member, the barrier-driving member rotates in the first direction by the urging force of the opening-urging member and the barrier blade moves from the closed position to the open position against the urging force of the closing-urging member.

DETAILED DESCRIPTION OF THE PREFERRED EMBODIMENTS

An embodiment of the present invention will now be described with reference to the drawings.

First Embodiment

Figure 1:
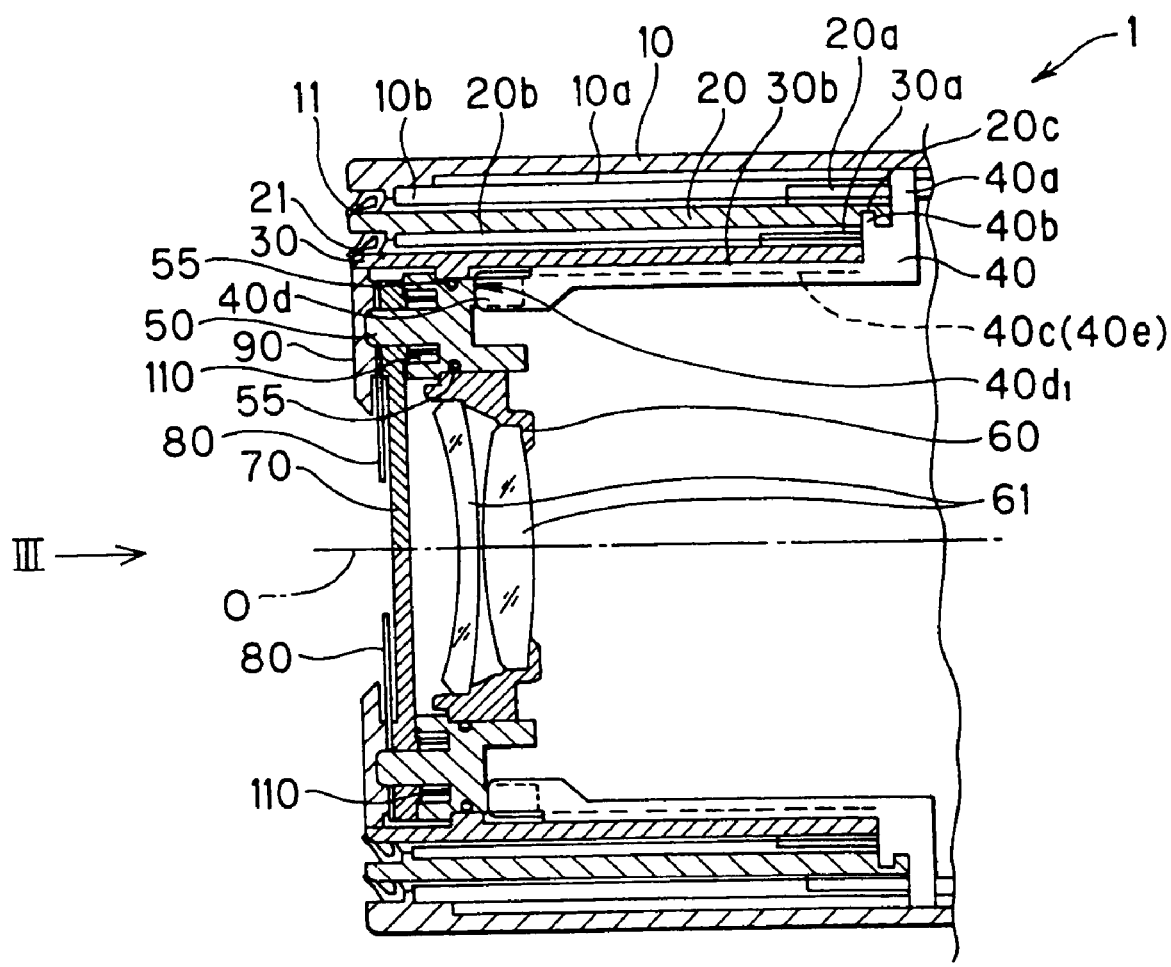
FIG. 1 is a sectional view of a lens barrel in a retracted position according to an embodiment of the present invention.
Figure 2:
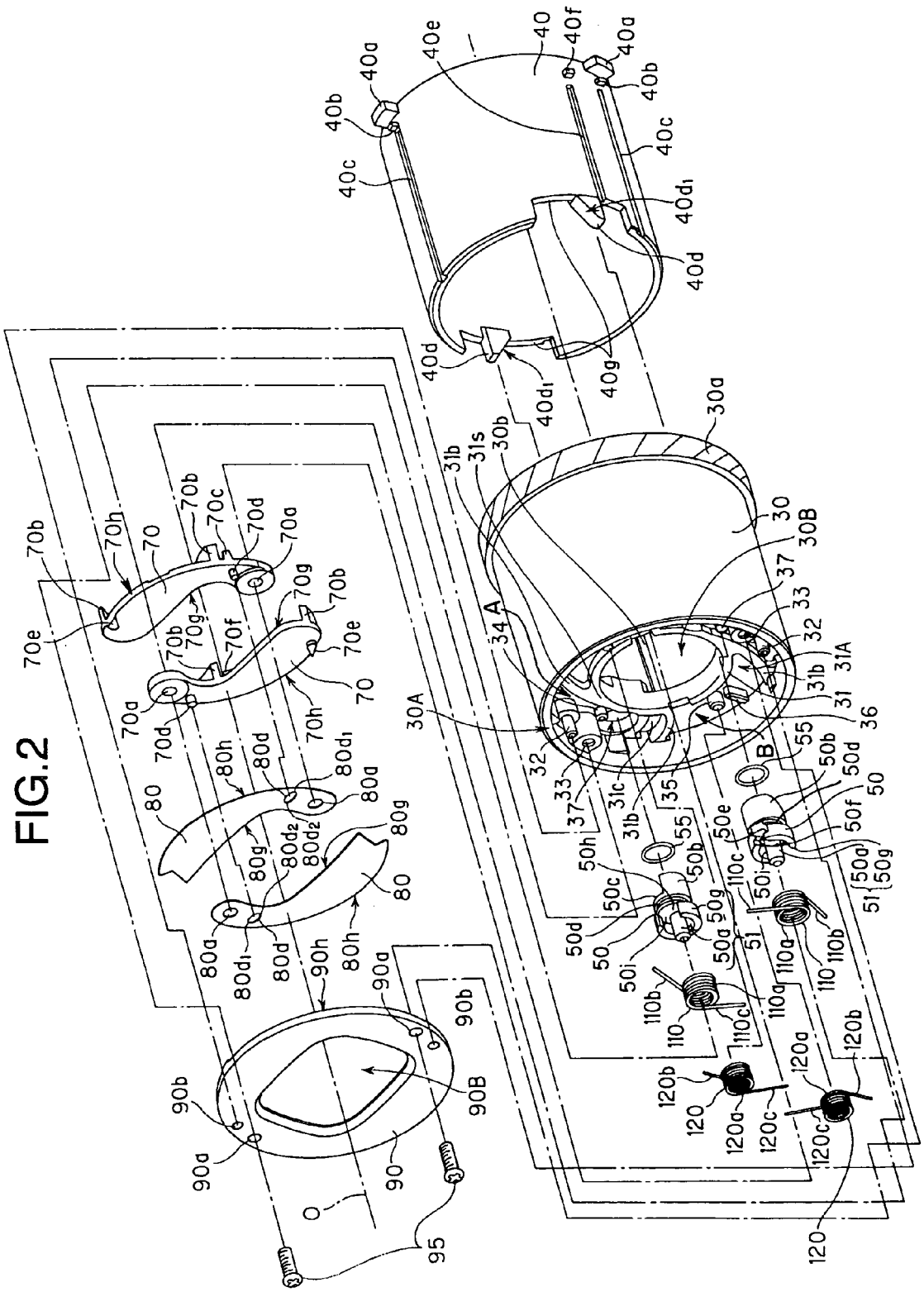
FIG. 2 is an exploded perspective view of a float key and a linear guiding frame of the lens barrel illustrated in FIG. 1.

FIG. 1 is a sectional view of a lens barrel in a retracted position according to an embodiment of the present invention. FIG. 2 is an exploded perspective view of a float key and a linear guiding frame of the lens barrel illustrated in FIG. 1.

As illustrated in FIG. 1, a lens barrel 1 comprises a fixed frame 10 having a proximal end portion attached to a camera body 200 described below (refer to FIG. 8); a rotating frame 20; which is a third frame, rotatably disposed inside the fixed frame 10; a linearly movable frame 30, which is a first frame, disposed inside the rotating frame 20 and which is movable backward and forward along an optical axis O from a retracted position (first position) to a second position (photographing position); a float key 40, which is a second frame, disposed inside the linearly movable frame 30 and which guides the linearly movable frame 30 so as to move linearly along the optical axis direction; a first lens group frame 60 supporting a first lens group 61, which is included in a photographic optical system, disposed inside the linearly movable frame 30 at a forward side in the optical axis direction of the linearly movable frame 30. To simplify the drawings, the second lens group, the third lens group included in the photographic optical system, the focus adjustment mechanism and the shutter mechanism are omitted.

On the inner surface of the fixed frame 10, three linear grooves 10a, for example, formed along the direction of the optical axis O, and female helical threads 10b, disposed spirally on the surface of the inner circumference of the fixed frame 10 at equal intervals, are provided. A light-blocking member 11 is attached at the distal end of the inner surface of the fixed frame 10. The light-blocking member 11 is interposed between the fixed frame 10 and the rotating frame 20 disposed inside the fixed frame 10 so that one of the edges of the light-blocking member 11 makes contact with the outer surface of the rotating frame 20 and the other edge contacts the inner surface of the fixed frame 10.

A motor driving source (not depicted in the drawings) for rotating the rotating frame 20 is disposed on the outer surface of the fixed frame 10.

At the rear end portion of the outer surface of the rotating frame 20, male helical threads 20a that are engaged with the female helical threads 10b of the fixed frame 10 are provided. Overlapping spur gears are provided on a part of the male helical threads 20a. These spur gears are engaged with the gears of the motor driving source (not depicted in the drawings) disposed on the fixed frame 10.

The rotating frame 20 is rotatably disposed inside the fixed frame 10 by the female helical threads 10b engaged to the male helical threads 20a. The male helical threads 20a are rotated by the motor driving source so that the rotating frame 20 moves forward and backward along the optical axis O as it rotates relative to the fixed frame 10.

The female helical threads 20b are formed on the inner surface of the rotating frame 20. Circumferential grooves 20c are formed around the circumference of the inner surface of the rotating frame 20 near the rear end portion.

At the distal end of the inner surface of the rotating frame 20, a light-blocking member 21 is disposed. The light-blocking member 21 is interposed between the rotating frame 20 and the linearly movable frame 30, disposed inside the rotating frame 20, so that one of the edges of the light-blocking member 21 makes contact with the outer surface of the linearly movable frame 30 and the other edge makes contact with the inner surface of the rotating frame 20. On the inner surface of the rotating frame 20, a cam groove (not depicted in the drawing) is disposed for driving a frame for supporting the second lens group and the third lens group (not depicted in the drawings), which are part of the photographic optical system of a zoom lens, forward and backward along the optical axis O.

At the rear end portion of the outer surface of the linearly movable frame 30, male helical threads 30a that are engaged with the female helical threads 20b on the rotating frame 20 are provided. The linearly movable frame 30 is rotatably disposed inside the rotating frame 20 by the female helical threads 20b engaged to the male helical threads 30a.

As illustrated in FIG. 2, an inward flange 31 having a central opening 30B for allowing light to pass through the first lens group 61, the second lens group, and the third lens group is provided at the distal end side of the inner surface of the linearly movable frame 30.

The inward flange 31 has a pair of barrier shaft holes 37 located on the periphery of the central opening 30B. The barrier shaft holes 37 are arranged symmetrically around the optical axis O. On a surface 31A in the forward direction of the optical axis (referred to as 'forward surface' thereafter) of the inward flange 31, columnar opening spring hooks 34 protruding in the forward direction along the optical axis O are disposed in the vicinity of the barrier shaft holes 37. The pair of opening spring hooks 34 is arranged symmetrically around the optical axis O.

A pair of screw holes 33 is formed on the forward surface 31A of the inward flange 31 and at the same time in the direction of going away from the optical axis O. The pair of screw holes 33 is arranged symmetrically around the optical axis O and is in contact with the inner circumference of the linearly movable frame 30.

A pair of engagement protrusions 32 is formed on the forward surface 31A of the inward flange 31 in the vicinity of the screw holes 33. The engagement protrusions 32 protrude in the forward direction along the optical axis O and are arranged symmetrically around the optical axis O. The proximal end portions of the engagement protrusions 32 are in contact with the inner surface of the linearly movable frame 30. The forward surfaces of the engagement protrusions 32 are flush with the circumferential surface 30A of the linearly movable frame 30.

The periphery of the opening 30B of the inward flange 31 has a circumferential rim 31s protruding in the forward direction from the forward surface 31A of the inward flange 31. On the forward surface 31A of the inward flange 31 and at the same time between the rim 31s and the inner circumferential surface of the linearly movable frame 30, four rails 31b radiate from the circumferential rim 31s and connect the circumferential rim 31s and the inner circumference of the linearly movable frame 30.

The four rails 31b are arc-shaped and protrude in the forward direction from the forward surface 31A of the inward flange 31. The four rails 31b are grouped into two pairs that are each arranged symmetrically around the optical axis O. The four rails 31b and the circumferential rim 31s are formed as an integral unit. Furthermore, the forward surfaces of the four rails 31b and the circumferential rim 31s are flush with each other in the optical axis direction on the forward side.

A pair of arc-shaped inserting grooves 31c is formed on the forward surface 31A of the inward flange 31. The pair of arc-shaped inserting grooves 31c is arranged symmetrically around the optical axis O. Each of the insertion grooves 31c is disposed in an area surrounded by one of the barrier shaft holes 37, one of the rails 31b, the circumferential rim 31s, and the inner circumference of the linearly movable frame 30.

A pair of areas A is arranged symmetrically around the optical axis O. The barrier shaft hole 37, opening spring hook 34, screw hole 33, engagement protrusion 32, and inserting groove 31c are provided in each area A surrounded by two of the rails 31b that are disposed asymmetrically relative to each other with respect to the optical axis O as a center, the circumferential rim 31s, and the inner surface of the linearly movable frame 30.

Each rail 31b surrounding the area A has a symmetrical rail 31b which is one of the rails 31b surrounding the other area A. In addition, each rail 31b has a shape different from that of its adjacent rails 31b. Each pair of rails 31b which are symmetrical to each other is arranged symmetrically with respect to the optical axis O as a center. A pair of areas B is arranged symmetrically around the optical axis O and is provided on the forward surface 31A of the inward flange 31. Each area B is surrounded by two of rails 31b, one of which surrounding the one of the areas A, the other of which surrounding the other area A. Therefore, each rail 31b divides the area B from the area A. A closing spring hook 36 which is a protrusion having an oval cross-section and protruding in the forward direction along the optical axis O and a closing spring shaft 35 which is located in the vicinity of the closing spring hooks 36 and which is shaped substantially like a column protruding in the forward direction along the optical axis O are provided in each area B.

Five linear movement keys 30b, which are protrusions functioning as rotation stoppers, extend along the optical axis O on the inner surface of the linearly movable frame 30 behind the inward flange 31. Two of the five linear movement keys 30b are provided in the vicinity of the barrier shaft holes 37.

The five linear movement keys 30b on the inner surface of the linearly movable frame 30 are slidably engaged with linear grooves 40c and 40e (described below). In this way, the float key 40 can slide forward and backward along the optical axis O. Instead of the above-described linear movement keys 30b and linear grooves 40c and 40e, protruding linear movement keys may be provided on the float key 40 so as to be engaged with linear grooves provided on the linearly movable frame 30.

Three linear movement keys 40a are provided on the rear end portion of the outer surface of the float key 40 at equal intervals around the circumference of the float key 40. The linear movement keys 40a protrude radially away from the optical axis O. As illustrated in FIG. 1, the three linear movement keys 40a are engaged with the three linear grooves 10a formed on the inner surface of the fixed frame 10. The float key 40 moves only along the optical axis O relative to the fixed frame 10 because of the linear movement keys 40a.

Three bayonets 40b, functioning as engaging parts, are provided on the outer surface of the float key 40, in near front of the linear movement keys 40a in the optical axis direction. The bayonets 40b are arranged at equal intervals around the circumference of the float key 40 and protrude radially away from the optical axis O.

Two bayonets 40f as engaging portions are provided in the vicinity of two of the three bayonets 40b and are arranged symmetrically around the optical axis O. The bayonets 40f protrude radially away from the optical axis O.

The protruding height of the bayonets 40b and the bayonets 40f is lower than the protruding height of the linear movement keys 40a. The bayonets 40f receive the force generated along the optical axis O when the linearly movable frame 30 is retracted to the float key 40.

The bayonets 40b and 40f are engaged with the circumferential grooves 20c provided on the inner surface of the rotating frame 20, as illustrated in FIG. 1. Accordingly, the circumferential grooves 20c restrict the movement in the optical axis direction of the float key 40 relative to the rotating frame 20. In other words, the float key 40 and the rotating frame 20 are guided by the circumferential grooves 20c so as to move forwards and backwards as a unit along the optical axis O.

Consequently, the circumferential grooves 20c of the rotating frame 20 function as a thrust position-restricting portion according to the embodiment of the present invention. The rotating frame 20 is rotatable around the optical axis O relative to the float key 40.

A pair of notches 40g is formed on the forward circumferential end of the float key 40. The notches 40g are arranged symmetrically around the optical axis O and extend towards the rear of the float key 40. A pair of triangular pole pressing parts 40d, protruding forwards and arranged symmetrically around the optical axis O, is provided. Each of the pressing parts 40d has a pressing surface 40d1, which is a surface inclined relative to the optical axis O.

Three linear grooves 40c, which function as guides, are formed on the outer surface of the float key 40 in parallel with the optical axis O and extend from the distal end of the float key 40 to the vicinity of the bayonets 40b on the front side in the optical axis direction. Three of the five linear movement keys 30b, provided on the inner surface of the linearly movable frame 30, are engaged with these linear grooves 40c.

Two linear grooves 40e, which function as guides, are formed on the outer surface of the float key 40 in the vicinity of the proximal end portion of the pair of pressing parts 40d in parallel with the optical axis O and extend from the distal end of the notches 40g to the vicinity of the bayonets 40f on the front side in the optical axis direction.

In other words, the respective two of the bayonets 40f and the linear grooves 40e among respective five are provided in the vicinity of the pressing parts 40d with respect to the circumference of the float key 40.

Two of the five linear movement keys 30b provided on the inner surface of the linearly movable frame 30 are slidably engaged with the two linear grooves 40e. The linear grooves 40e are supplemental grooves for receiving the force generated around the optical axis O when the linearly movable frame 30 is retracted to the float key 40.

Accordingly, by slidably engaging the five linear movement keys 30b to the three linear grooves 40c and two linear grooves 40e, the float key 40 is slidably engaged with the linearly movable frame 30 so that the float key 40 is slidable forwards and backwards along the optical axis O.

Consequently, even when the male helical threads 30a of the linearly movable frame 30 and the female helical threads 20b of the rotating frame 20 are engaged and the linearly movable frame 30 receives a rotational force from the rotating frame 20, the linearly movable frame 30 is guided by the linear grooves 40c and 40e to only move forwards and backwards along the optical axis O relative to the float key 40.

As described above, in the lens barrel 1, the rotating frame 20 and the float key 40 move backwards along the optical axis O relative to the fixed frame 10 when the rotating frame 20 is rotated by the motor driving source. The linearly movable frame 30 also receives rotational force from the rotating frame 20 and is guided by the float key 40 to move forwards and backwards along the optical axis O.

A pair of barrier-driving members 50 is partially engaged with the pair of barrier shaft holes 37 formed on the inward flange 31 of the linearly movable frame 30 such that the barrier-driving members 50 are rotatable around axes parallel to the optical axis O. Each of the barrier-driving members 50 mainly comprises a shaft 50b and a spring receiver 51 formed in the shaft 50b in the optical axis forward direction.

The shaft 50b is a hollow cylinder. A cam surface 50c, which is inclined with respect to the optical axis O, is formed on the end part in the optical axis rearward direction of the sidewall of the shaft 50b.

The cam surface 50c comes into contact with the pressing surface 40d1 on pressing parts 40d of the float key 40 when the linearly movable frame 30 is retracted to the float key 40. As a result, the barrier-driving members 50 rotate in a second direction. Here, the second direction is the direction opposite from a first direction, which is the direction corresponding to the closing movement of first and second barrier blades 70 and 80, as described below.

The outer diameter of the shaft 50b is substantially the same as the inner diameter of the barrier shaft hole 37. Furthermore, an O-ring groove 50d for setting a waterproof O-ring 55 is formed around the outer circumference of the shaft 50b at the side close to the spring receiver 51.

On the forward surface of the shaft 50b, the spring receiver 51 having a W-shaped cross-section and a circular bottom surface with a diameter larger than the diameter of the shaft 50b is provided. The bottom surface of the spring receiver 51 (i.e., the rear surface of the spring receiver 51 on which the shaft 50b is not formed) is in contact with the forward surface 31A of the inward flange 31.

Accordingly, only the shaft 50b is rotatably engaged with the barrier shaft hole 37. When the shaft 50b is engaged with the barrier shaft hole 37, the outer circumference of the O-ring 55 comes into contact with the barrier shaft hole 37 and causes the O-ring 55 to undergo elastic deformation. As a result, the inner surface of the barrier shaft hole 37 and the outer surface of the shaft 50b are engaged in a water-tight manner with the O-ring 55 so that dust and water do not enter the inside of the linearly movable frame 30.

The spring receiver 51 comprises a barrier shaft 50a, which protrudes forward along the optical axis O from the center of the bottom surface of the spring receiver 51, and a spring guide 50g, which is an arc-shaped sidewall protruding forward along the optical axis O from the periphery of the bottom surface of the spring receiver 51 at a height lower than the barrier shaft 50a. The pair of barrier shafts 50a function as rotary shafts for the first and second barrier blades 70 and 80, as described below.

The spring guide 50g includes a movable arm insertion part 50e, in the form of a notch, and a fixed arm insertion part 50h, which is also in the form of a notch but larger than the movable arm insertion part 50e. These notches are formed in a direction parallel to the optical axis O. One of the end surfaces of the movable arm insertion part 50e parallel with the optical axis O functions as a spring pressing part 50f.

The inner circumferential surface of the spring guide 50g and the bottom surface of the spring receiver 51 define a spring storage space 50i for storing a barrier opening spring 110 (described below). More specifically, a part of the barrier opening spring 110, which applies an urging force to move the barrier blade to an open position, is stored in the spring storage space 50i.

The barrier opening spring 110 comprises a support 110a (which is a torsion coil spring according to this embodiment), a fixed arm 110b, and a movable arm 110c. The barrier shaft 50a of the barrier-driving member 50 is inserted into the support 110a and the support 110a is stored in the spring storage space 50i.

The fixed arm 110b of the barrier opening spring 110 is passed through the fixed arm insertion part 50h of the barrier-driving member 50, and the movable arm 110c is passed through the movable arm insertion part 50e of the barrier-driving member 50.

The tip of the fixed arm 110b is attached between one of the opening spring hooks 34, which is provided on the forward surface of the inward flange 31 of the linearly movable frame 30, and one of the bosses having the screw hole 33. The center of the movable arm 110c is attached to the spring pressing part 50f of the spring guide 50g provided on the barrier-driving member 50.

Accordingly, the movable arm 110c of the barrier opening spring 110 constantly urges the spring pressing part 50f of the barrier-driving member 50 towards the above-mentioned first direction around the circumference of the shaft 50b. Here, the first direction is the direction corresponding to the opening movement of the first and second barrier blades 70 and 80. Moreover, the tip of the movable arm 110c is attached to an opening spring hook 70c of the first barrier blade 70, described below.

A pair of barrier closing springs 120, which urge the barrier blades towards a closed position, is inserted into the pair of closing spring shafts 35 provided on the forward surface 31A of the inward flange 31 of the linearly movable frame 30. The barrier closing springs 120 in this embodiment are torsion springs.

Each of the barrier closing springs 120 comprises a support 120a, which is a coil portion, a fixed arm 120b, and a movable arm 120c. The closing spring shaft 35 of the inward flange 31 is inserted into the support 120a.

The fixed arm 120b of the barrier closing spring 120 is attached to one of the closing spring hooks 36 provided on the forward surface 31A of the inward flange 31 of the linearly movable frame 30. The movable arm 120c of the barrier closing spring 120 is attached to a closing spring hook 70f of the first barrier blade 70, described below.

A pair of first barrier blades 70 is disposed on the forward surface 31A of the inward flange 31 of the linearly movable frame 30. The first barrier blades 70 move to open and close the opening 30B. More specifically, the first barrier blades 70 move between a closed position in which at least a part of the light path of the first, second, and third lens groups, comprising a photographic optical system, is blocked and an open position in which the first barrier blades 70 move away from the light path. In this embodiment, the pair of first barrier blades 70 blocks a part of the light path in the vicinity of the optical axis O of the photographic optical system.

The first barrier blades 70 are partially arc-shaped plates. When the first barrier blades 70 move to the closed position, the circumferential surfaces of the first barrier blades 70 parallel to the optical axis O (hereinafter referred to as inner circumferential surfaces 70g) are engaged with each other so as to seal the first barrier blades 70 together.

On one of the ends of each of the first barrier blades 70, a shaft hole 70a is formed. The shaft hole 70a is engaged with the tip of the barrier shaft 50a of the barrier-driving member 50, which is engaged with the support 110a of the barrier opening spring 110. The first barrier blades 70 are disposed such that they are in contact with the end part in the optical axis forward direction of the spring guide 50g of the barrier-driving members 50.

In the open position, the first barrier blades 70 are disposed inside the linearly movable frame 30 at positions that do not block the opening 30B. In other words, the first barrier blades 70 cover the forward sides of the spring storage spaces 50i and the spring guides 50g, the pair of barrier opening springs 110, the four rails 31b, the pair of inserting grooves 31c, the pair of closing spring shafts 35, the pair of closing spring hooks 36, and the pair of barrier closing springs 120. In this way, the first barrier blades 70 prevent dust from entering the supports 110a and 112a of the barrier opening springs 110 and barrier closing springs 120, respectively.

In the closed position, the surfaces of the first barrier blades 70 parallel to the optical axis O (hereinafter referred to as 'outer surfaces 70h') come into contact with open position stoppers 31d, which are provided on the linearly movable frame 30 to restrict the opening movement.

A blade driving pin 70d is provided in the vicinity of the shaft hole 70a on the front surface in the optical axis direction of each of the first barrier blades 70.

Further on the surfaces of the first barrier blades 70 at the side where the below-mentioned second barrier blades 80 are arranged are provided thrust receivers 70e to prevent tilting of the second barrier blades 80 relative to the optical axis O by contacting forward surfaces of the second barrier blades 80 in the optical axis direction near outer peripheral surfaces 70h at the edges of the first barrier blades 70.

The peripheral surfaces of each of the shaft holes 70a protrudes forward along the optical axis O and is the same height as the tip of the thrust receiver 70e. The peripheral surfaces of the pair of shaft holes 70a prevent the second barrier blades 80 from tilting. In other words, the positions of the second barrier blades 80 relative to the optical axis O are determined by the peripheral surfaces of the shaft holes 70a of the first barrier blades 70 and the thrust receivers 70e provided at the distal ends of the first barrier blades 70.

In addition, at a position near the outer peripheral surface 70h of each of the first barrier blades 70 substantially opposite to the blade driving pin 70d at the side where the barrier-driving member 50 is arranged is provided an opening spring hook 70c shaped like a column to which the tip of the movable arm 110c of the barrier opening spring 110 is attached such as to protrude toward the barrier-driving member 50 from the rear surface of the first barrier blade 70. The tip of the opening spring hook 70c is inserted into one of the insertion grooves 31c of the inward flange 31 of the linearly movable frame 30 so that the opening spring hook 70c is slidable along the insertion groove 31c. Thus, the first barrier blades 70 are urged towards the open position by the barrier opening springs 110.

Further, thrust receivers 70b are provided on the surface facing the inward flange 31 of each of the first barrier blades 70, protruding toward the inward flange 31 side. The thrust receivers 70b are provided at a position in the vicinity of the opening spring hook 70c and nearer to the distal end side of the first barrier blades 70 than the opening spring hook 70c, and at the position in the vicinity of the distal end of the first barrier blades 70. The thrust receiver 70b is provided in arc shape connecting the edge of the first barrier blades 70 on the inner circumferential surface 70g side and the edge of the outer circumferential side 70h. The thrust receiver 70b thus provided prevents the first barrier blades 70 from tilting to the direction of the optical axis O by contacting and sliding along rails 31b formed on the forward surface 31A of the inward flange 31 of the linearly movable frame 30.

A columnar closing spring hook 70f is provided on the surface facing the barrier closing spring 120 of the first barrier blades 70, protruding toward the barrier closing spring 120. The arm part of the movable arm 120c of the barrier closing spring 120 is engaged with the closing spring hook 70f. By being engaged in this way, the first barrier blades 70 are constantly urged toward the closed position by the pair of barrier closing springs 120.

The pair of second barrier blades 80 is disposed in the pair of first barrier blades 70 in the optical axis forward direction. The pair of second barrier blades 80 is partially arc-shaped plates.

A shaft hole 80a is provided on one of the ends of each of the second barrier blades 80. The tip of the barrier shaft 50a of the barrier-driving member 50 is inserted into the shaft hole 80a, wherein the support 110a of the barrier opening spring 110 and the support 70a of the first barrier blade 70 are inserted into the barrier shaft 50a.

The second barrier blade 80 has an inner circumferential surface 80g which is parallel to the optical axis and is on the same side of the optical axis O, and an outer circumferential surface 80h which is parallel to the optical axis O and is on the opposite side of the optical axis O. Further, a long hole 80d is provided in the vicinity of the shaft hole 80a. The longitudinal direction of the long hole 80d runs along the direction connecting the inner circumferential surface 80g and the outer circumferential surface 80h.

The blade driving pin 70d of each of the first barrier blades 70 is inserted into the long hole 80d. When each of the second barrier blades 80 is at the open position, the blade driving pin 70d is in contact with the first contacting area 80d1 of the long hole 80d.

The second barrier blade 80 is opened and closed by the blade driving pin 70d, as described below. In other words, the pair of second barrier blades 80 opens and closes in conjunction with the pair of first barrier blades 70.

A barrier cover 90 is disposed in front of the pair of second barrier blades 80 in the optical axis forward direction. The barrier cover 90 is disposed at the distal end of the linearly movable frame 30.

The barrier cover 90 is a disk having an opening 90B shaped as a rectangle with round corners so as to cover the outer circumference of the opening 30B of the inward flange 31 when the barrier cover 90 is disposed in the linearly movable frame 30.

A pair of boss holes 90b arranged symmetrically around the optical axis O is formed in the vicinity of the outer circumference of the opening 90B of the barrier cover 90. The engagement protrusions 32 of the inward flange 31 are inserted into these boss holes 90b. A pair of insertion holes 90a arranged symmetrically around the optical axis O is formed in the vicinity of the boss holes 90b. The insertion holes 90a oppose the screw holes 33 on the inward flange 31.

Screws 95 are inserted into the insertion holes 90a and screwed into the screw holes 33 on the inward flange 31. In this way, the barrier cover 90 is fixed to the inner distal end of the linearly movable frame 30.

An outer circumferential surface 90h of the barrier cover 90 is in close contact with the inner surface of the linearly movable frame 30. The front surface in the optical axis direction of the barrier cover 90 is flush with the forward surface 30A of the linearly movable frame 30.

Next, the movement of the above-described lens barrel 1 from a retracted position to a photographing position and from the photographing position to the retracted position will be described with reference to FIGS. 1 to 7.

Figure 3:
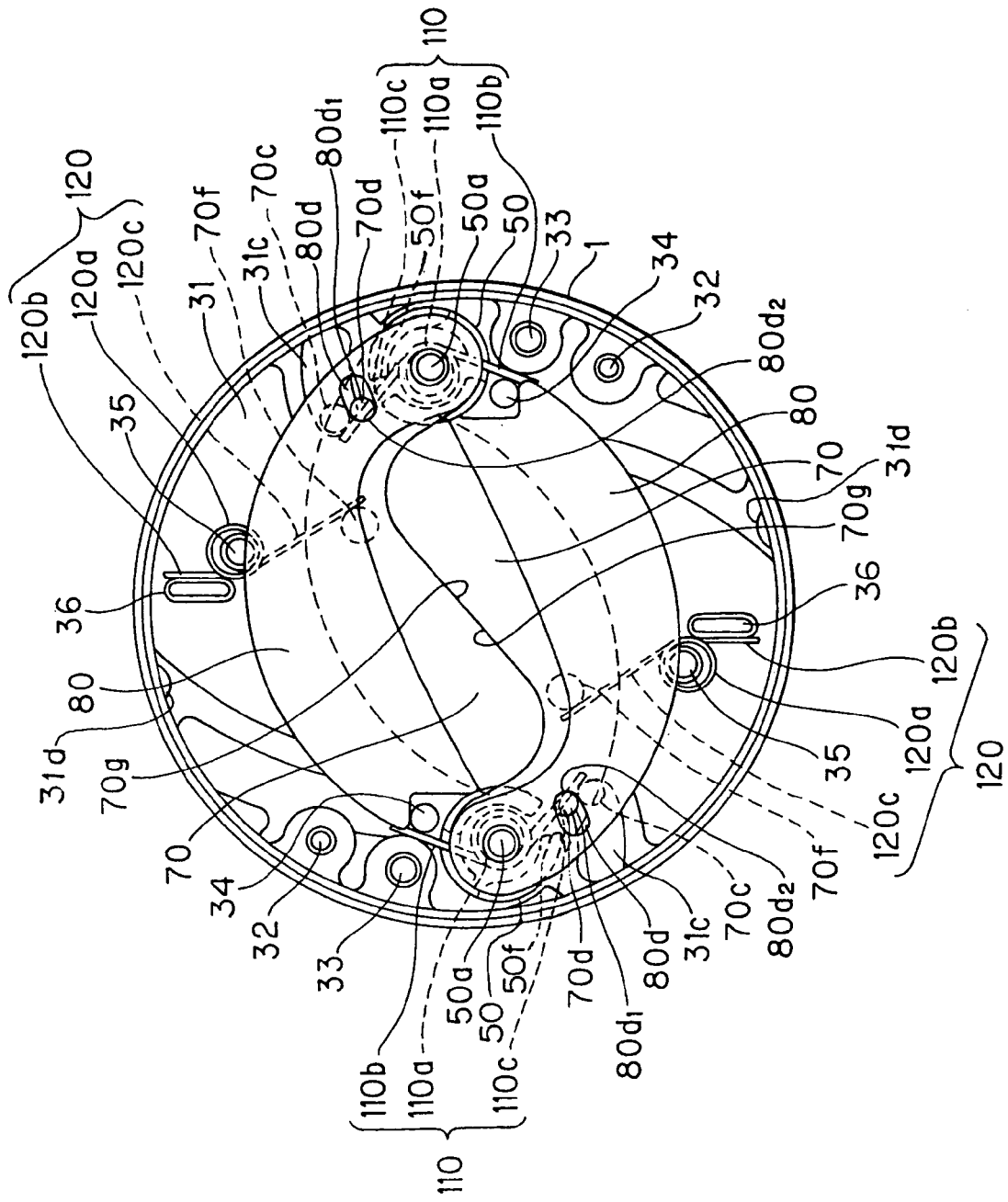
FIG. 3 is a front view of the lens barrel viewed from direction III in FIG. 1.
Figure 4:
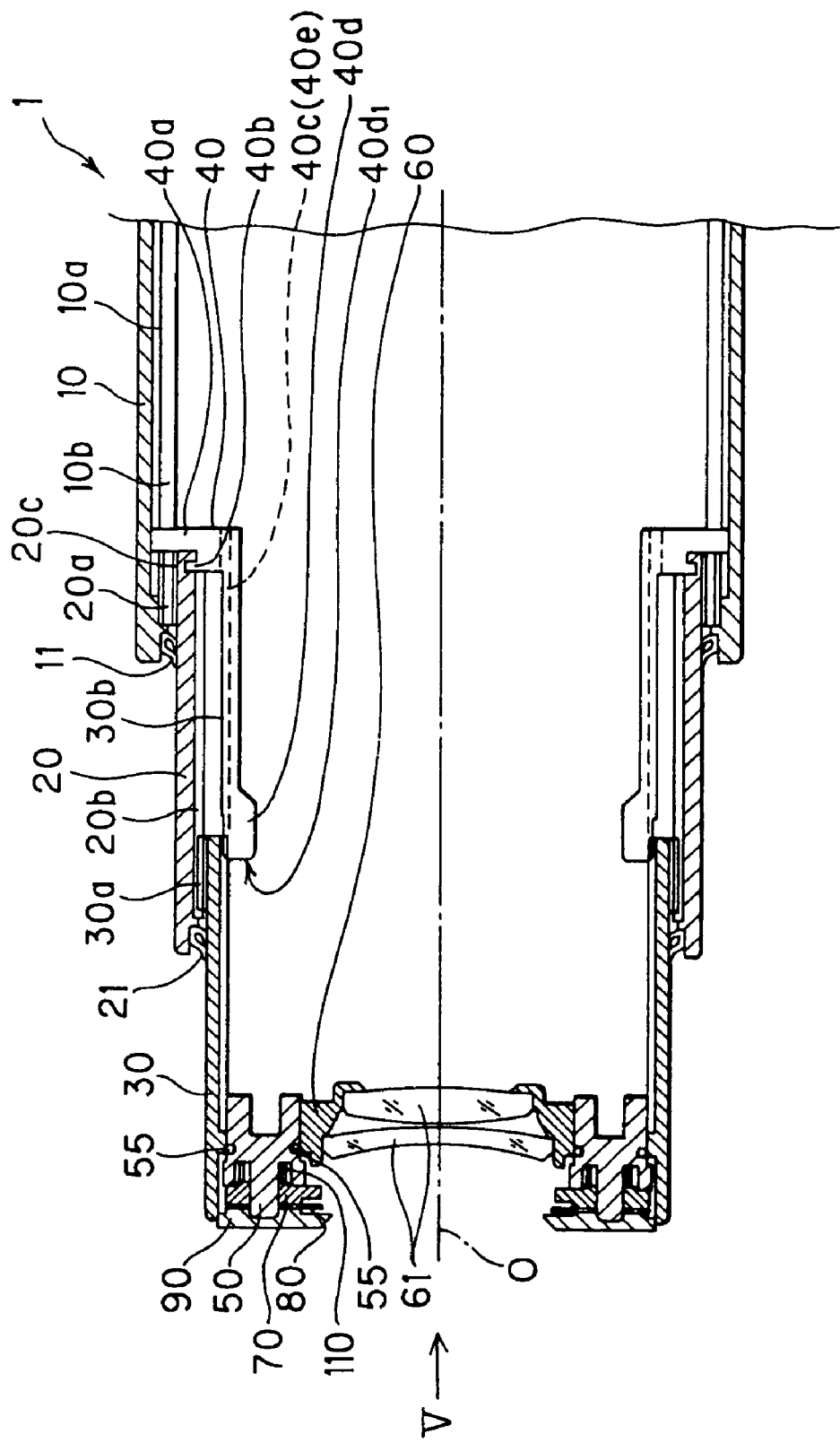
FIG. 4 is a sectional view of the lens barrel illustrated in FIG. 1 in a photographing position.
Figure 5:
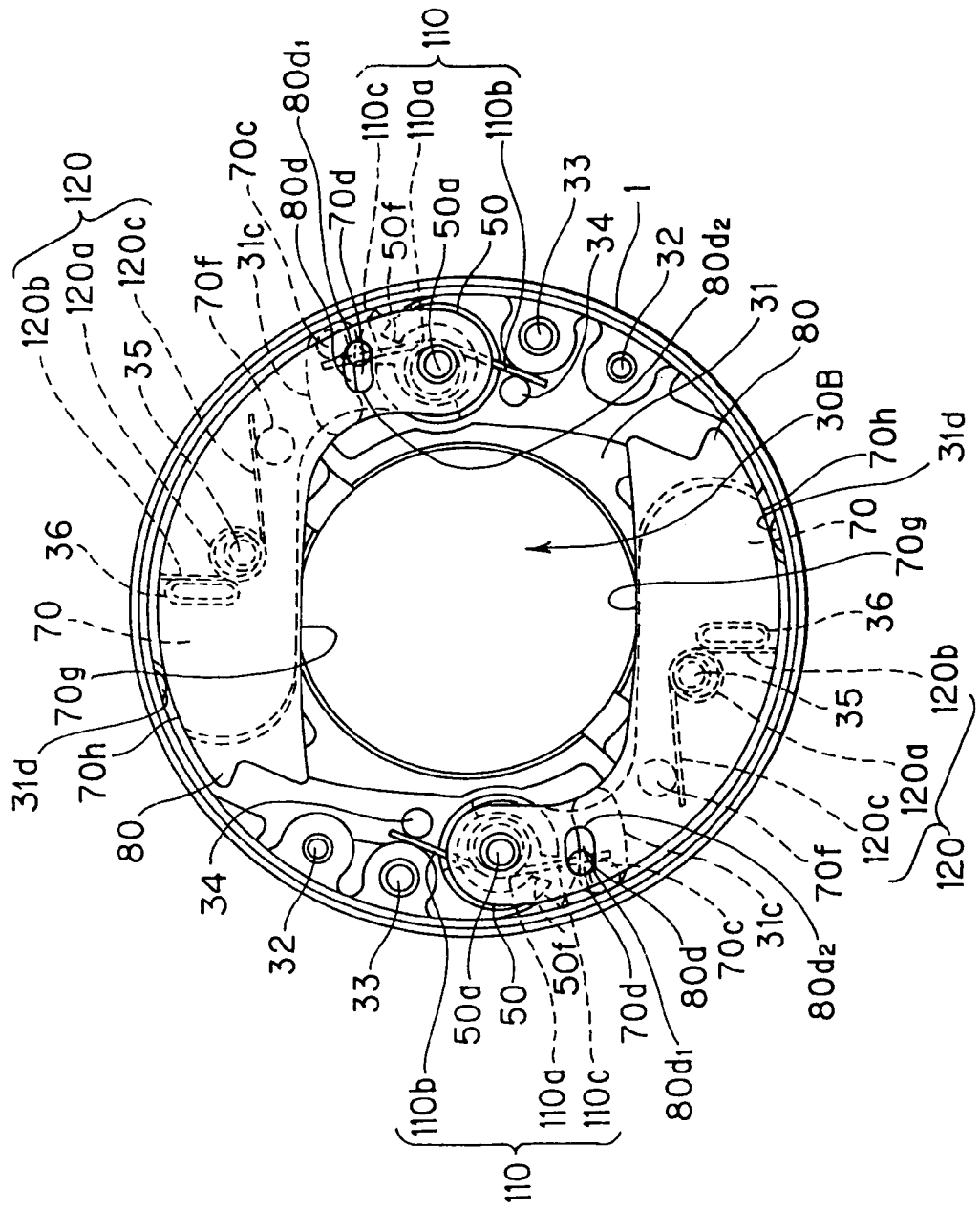
FIG. 5 is a front view of the lens barrel viewed from direction V in FIG. 4.
Figure 6:
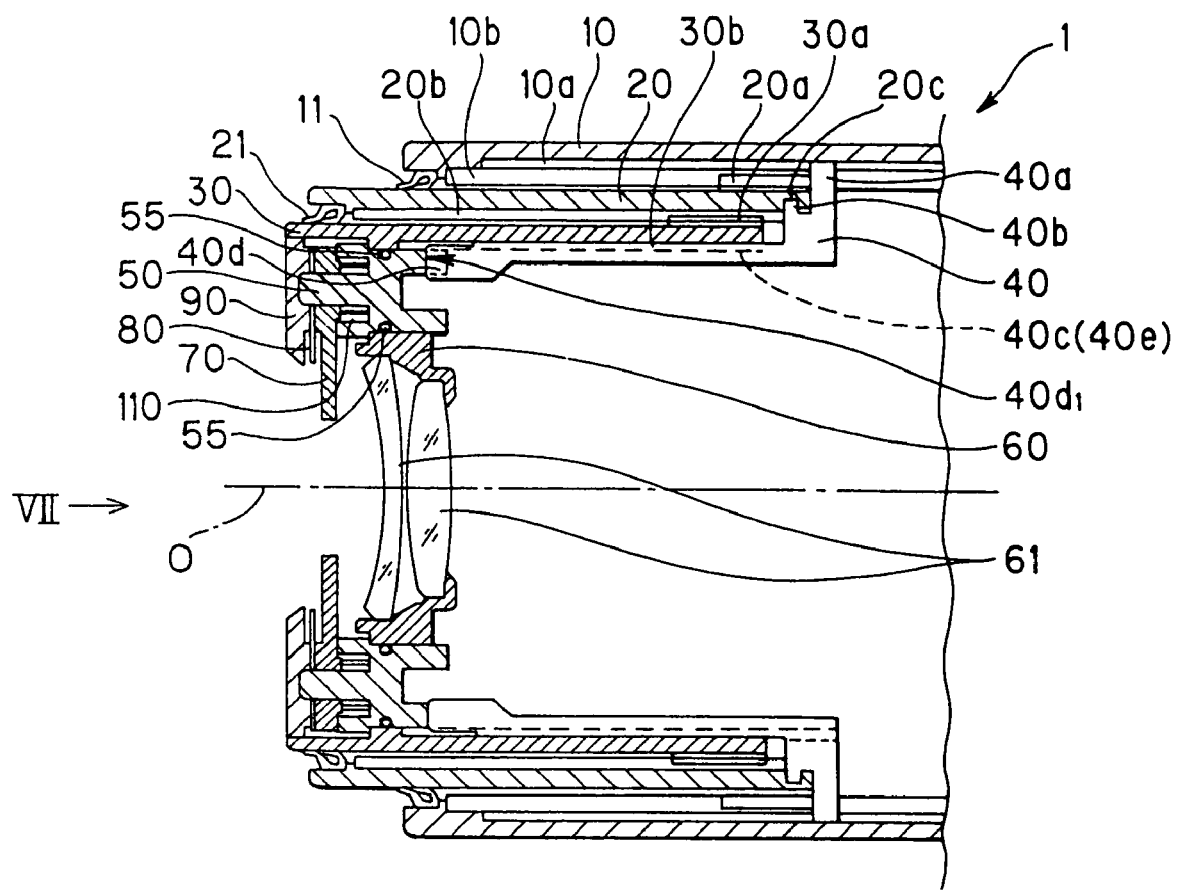
FIG. 6 is sectional view of the lens barrel illustrated in FIG. 1 indicating a position in which second barrier blades begins to close.
Figure 7:
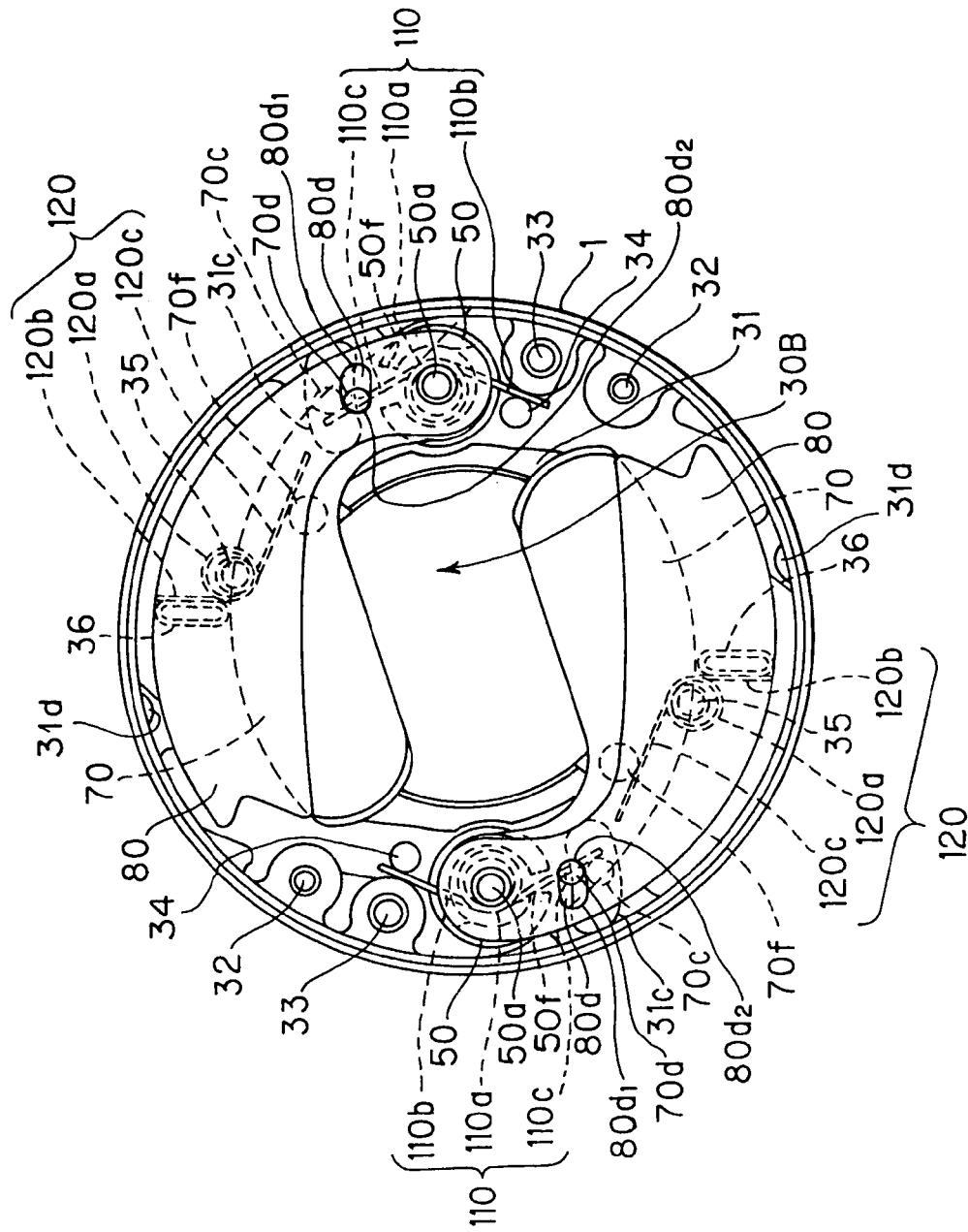
FIG. 7 is a front view of the lens barrel viewed from direction VII in FIG. 6.

FIG. 3 is a front view of the lens barrel 1 viewed from direction III in FIG. 1. FIG. 4 is a sectional view of the lens barrel 1 illustrated in FIG. 1 in a photographing position. FIG. 5 is a front view of the lens barrel 1 viewed from direction V in FIG. 4. FIG. 6 is sectional view of the lens barrel 1 illustrated in FIG. 1 indicating a position in which second barrier blades begin to close. FIG. 7 is a front view of the lens barrel 1 viewed from direction VII in FIG. 6.

As illustrated in FIG. 1, when the lens barrel 1 is in the retracted position, the rotating frame 20, the linearly movable frame 30, and the float key 40 are retracted inside the fixed frame 10. Here, the linearly movable frame 30 is at a first position, i.e., the retracted position.

At this time, the pressing surface 40$d1$ of the pressing parts 40$d$ provided on the float key 40 is in contact with the cam surface 50$c$ of the shaft 50$b$ provided on the barrier-driving member 50, which is inserted into the barrier shaft hole 37 of the inward flange 31 of the linearly movable frame 30.

In this state, the barrier-driving member 50 is rotated in a second direction to close the first barrier blades 70 and the second barrier blades 80.

The closing spring shafts 35 of the inward flange 31 are inserted into the supports 120$a$ of the barrier closing springs 120. The movable arms 120$c$ of the barrier closing springs 120 urge the closing spring hooks 70$f$ of the first barrier blades 70 to keep the first barrier blades 70 in a closed position, as illustrated in FIG. 3.

In this way, the first barrier blades 70 are rotated toward the closed position. In other words, the inner circumferential surfaces 70$g$ of the first barrier blades 70 are closely engaged with each other, as illustrated in FIG. 3, to block the light path of the first, second, and third lens groups.

The blade driving pins 70$d$ of the first barrier blades 70 urge second contact areas 80$d2$ of the second barrier blades 80 toward the closed position. The second barrier blades 80 that have moved to the closed position, as illustrated in FIG. 3, block the light path of the first, second, and third lens groups.

In this state, the edges of the second barrier blades 80 are in contact with the opening spring hooks 34. In other words, the opening spring hooks 34 restrict the position of the second barrier blades 80 at the closed position.

At this time, the movable arms 110$c$ of the opening springs 110 are in contact with the spring pressing parts 50$f$ of the barrier-driving members 50. In this way, the force urging the first barrier blades 70 towards the open position is reserved.

When the lens barrel 1 is retracted, the pressing surfaces 40$d1$ of the pressing parts 40$d$ provided on the float key 40 are in contact of the cam surfaces 50$c$ of the barrier-driving members 50. Thus, the rotation of the barrier-driving members 50 is restricted. Consequently, the urging force of the opening spring 110 is not fully transmitted to the first barrier blades 70. As a result, the first barrier blades 70 are urged toward the closed position by the barrier closing springs 120.

Accordingly, even if the first barrier blades 70 are forcefully moved to the open position from the closed position by, for example, a user finger operating the first barrier blades 70, the first barrier blades 70 immediately return to the closed position when the finger is released. The second barrier blades 80 also return to the closed position in conjunction with the first barrier blades 70.

By rotating the motor driving source disposed on the outer periphery of the fixed frame 10, the male helical threads 20$a$ of the rotating frame 20 rotate. As a result, as described above, the rotating frame 20 and the float key 40 move forward (protrude) along the optical axis O.

The linearly movable frame 30 receives rotational force from the rotating frame 20. Accordingly, the five linear movement keys 30$b$ formed on the inner surface of the linearly movable frame 30 become engaged with the linear grooves three 40$c$ and two 40$e$ of the float key 40. As a result, the linearly movable frame 30 slides (or protrudes) forward along the optical axis O.

In this way, the lens barrel 1 moves from the retracted position, illustrated in FIG. 1, to the photographing position, illustrated in FIG. 4. FIG. 4 illustrates the lens barrel 1 in tele mode in the photographing position. The first barrier blades 70 and the second barrier blades 80 are in the open position when the lens barrel 1 is in a wide mode at the photographing position. The lens barrel 1 stays in the open position when it is in tele mode.

When the lens barrel 1 is moved from the retracted position to the photographing position, the pressing surfaces 40$d1$ of the pressing parts 40$d$ on the float key 40, which are urged forward along the optical axis O, move apart from the cam surfaces 50$c$ of the shafts 50$b$ on the barrier-driving members 50.

Accordingly, the centers of the movable arms 110$c$ attached to the spring pressing parts 50$f$ of the spring guides 50$g$ on the barrier-driving members 50 urge the spring pressing parts 50$f$ toward the first direction, which is the circumferential direction corresponding to the opening movement of the first barrier blades 70 and the second barrier blades 80. As a result, the barrier-driving members 50 are turned in the first direction.

At this time, the distal end of the movable arms 110$c$ of the barrier opening springs 110 generate an urging force by being attached to the opening spring hooks 70$c$ of the first barrier blades 70. These movable arms 110$c$ urge the opening spring hooks 70$c$ so that the first barrier blades 70 move to the open position, as illustrated in FIG. 5.

Accordingly, the first barrier blades 70 move to the open position. More specifically, as illustrated in FIG. 5, the outer circumferential surfaces 70$h$ of the first barrier blades 70 come into contact with the open position stoppers 31$d$ provided on the inner surface of the linearly movable frame 30. The inner circumferential surfaces 70$g$ of the first barrier blades 70 move away from the light path of the first, second, and third lens groups. In other words, the first barrier blades 70 move away from the light path of the first, second, and third lens groups.

While the first barrier blades 70 move from the closed position to the open position, the thrust receivers 70$b$ of the first barrier blades 70 slide along the rails 31$b$ of the inward flange 31.

The blade driving pins 70$d$ of the first barrier blades 70 contact and urge the first contacting areas 80$d1$ of the second barrier blades 80 to move the second barrier blades 80 to the open position, as illustrated in FIG. 5. In this way, the second barrier blades 80 move away from the light path of the first, second, and third lens groups.

When the second barrier blades 80 are in the open position, the outer circumferential surfaces 80$h$ of the second barrier blades 80 are in contact with the open position stoppers 31$d$ provided on the inner surface of the linearly movable frame 30.

In the open condition, a force urging the first barrier blades 70 to the closed position is generated in the movable arms 120$c$ of the barrier closing springs 120 engaged with the closing spring hooks 70$f$ of the first barrier blades 70.

However, when the first barrier blades 70 are at the open position, the urging force of the movable arms 110c of the barrier opening spring 110 in the direction to the open position is larger than the urging force of the movable arm 120c of the barrier closing spring 120 in the direction to the closed position.

Accordingly, even if the first barrier blades 70 are forcefully moved to the closed position from the open position by, for example, a user finger operating the first barrier blades 70, the first barrier blades 70 immediately return to the open position when the finger is released. The second barrier blades 80 also return to the open position in conjunction with the first barrier blades 70.

When the lens barrel 1 is moved from the photographing position to the retracted position again, the above-mentioned motor driving source disposed on the outer surface of the fixed frame 10 rotates the linearly movable frame 30 in the direction opposite to when the lens barrel 1 is moved from the retracted position to the photographing position. At the same time, the male helical threads 20a of the rotating frame 20 also turn to cause the rotating frame 20 and the float key 40 to retreat in the optical axis direction to the retracted position.

At this time, the linearly movable frame 30 receives the rotational force of the rotating frame 20. As a result, the five linear movement keys 30b on the inner surface of the linearly movable frame 30 slide along the linear grooves three 40c and two 40e of the float key 40 in the rear direction in the optical axis direction. Accordingly, the linearly movable frame 30 retracts to the float key 40.

In this way, the lens barrel 1 moves from the photographing position, illustrated in FIG. 4, to the retracted position, illustrated in FIG. 1, via the transitional position, illustrated in FIG. 6.

When the lens barrel 1 is moved from the photographing position to the retracted position, the linearly movable frame 30, protruding forward in the optical axis direction in the photographing position, retracts to the fixed frame 10 together with the rotating frame 20. At this time, the pressing surfaces 40d1 of the pressing parts 40d on the float key 40 come into contact with the cam surfaces 50c of the shafts 50b of the barrier-driving members 50 and start pressing the cam surfaces 50c forward in the optical axis direction, as illustrated in FIG. 6. As the cam surfaces 50c are pressed toward the pressing surfaces 40d1 of the pressing parts 40d, the barrier-driving members 50 rotate in a direction against the urging force of the barrier opening springs 110.

At this time, the movable arms 120c of these barrier closing springs 120 start to urge the closing spring hooks 70f of the first barrier blades 70 toward the closed position.

As a result, the first barrier blades 70 start to move toward the closed position. In other words, the inner circumference surfaces 70g of the first barrier blades 70 start moving to the closed position in which the inner circumference surfaces 70g are engaged with each other, as illustrated in FIG. 3. In this way, the first barrier blades 70 become sealed together to block the light path of the first, second, and third lens groups.

When the pair of first barrier blades 70 moves to the position shown in FIG. 7, the blade driving pins 70d of the pair of first barrier blades 70 who have become in contact with the first contacting areas 80d1 of the pair of second barrier blades 80 to urge them in the open position become in contact with the second contacting areas 80d2 of the pair of the second barrier blades 80 and start urging them.

As a result, the second barrier blades 80 start to rotate toward the closed position. Then, the lens barrel 1 moves from the transitional position, illustrated in FIG. 6, to the retracted position, as illustrated in FIG. 1. The linearly movable frame 30 protruding forward along the optical axis direction retracts to the fixed frame 10 together with the rotating frame 20.

As the first barrier blades 70 move from the open position to the closed position, the thrust receivers 70b of the first barrier blades 70 slide along the rails 31b of the inward flange 31.

When the linearly movable frame 30 receives the rotational force of the rotating frame 20 and is retracted relative to the float key 40, the linearly movable frame 30 retracts in the backward along the optical axis direction because the five linear movement keys 30b on the inner surface of the linearly movable frame 30 slide backwards along the optical axis O on the linear grooves three 40c and two 40e, of the float key 40.

At this time, the load for driving the barrier-driving members 50 is transmitted to the float key 40 via the pressing surface 40d1 of the pressing parts 40d as a force to rotate the float key 40 around the optical axis O and a force for moving the float key 40 along the optical axis O.

However, the bayonets 40f, formed on the float key 40 at a position along substantially the same axis as the pressing parts 40d parallel to the optical axis O, receive the applied force. Moreover, the pair of linear grooves 40e, formed on the float key 40 at a position along substantially the same axis as the pressing parts 40d parallel to the optical axis O, supplement the pressing parts 40d in receiving the applied force. Therefore, the float key 40 is not deformed.

In other words, deformation of the float key 40 can be prevented by receiving the load for rotating the barrier-driving members 50 with the bayonets 40f and the linear grooves 40e provided in the vicinity of the pressing parts 40d, which receive the load.

Figure 8:
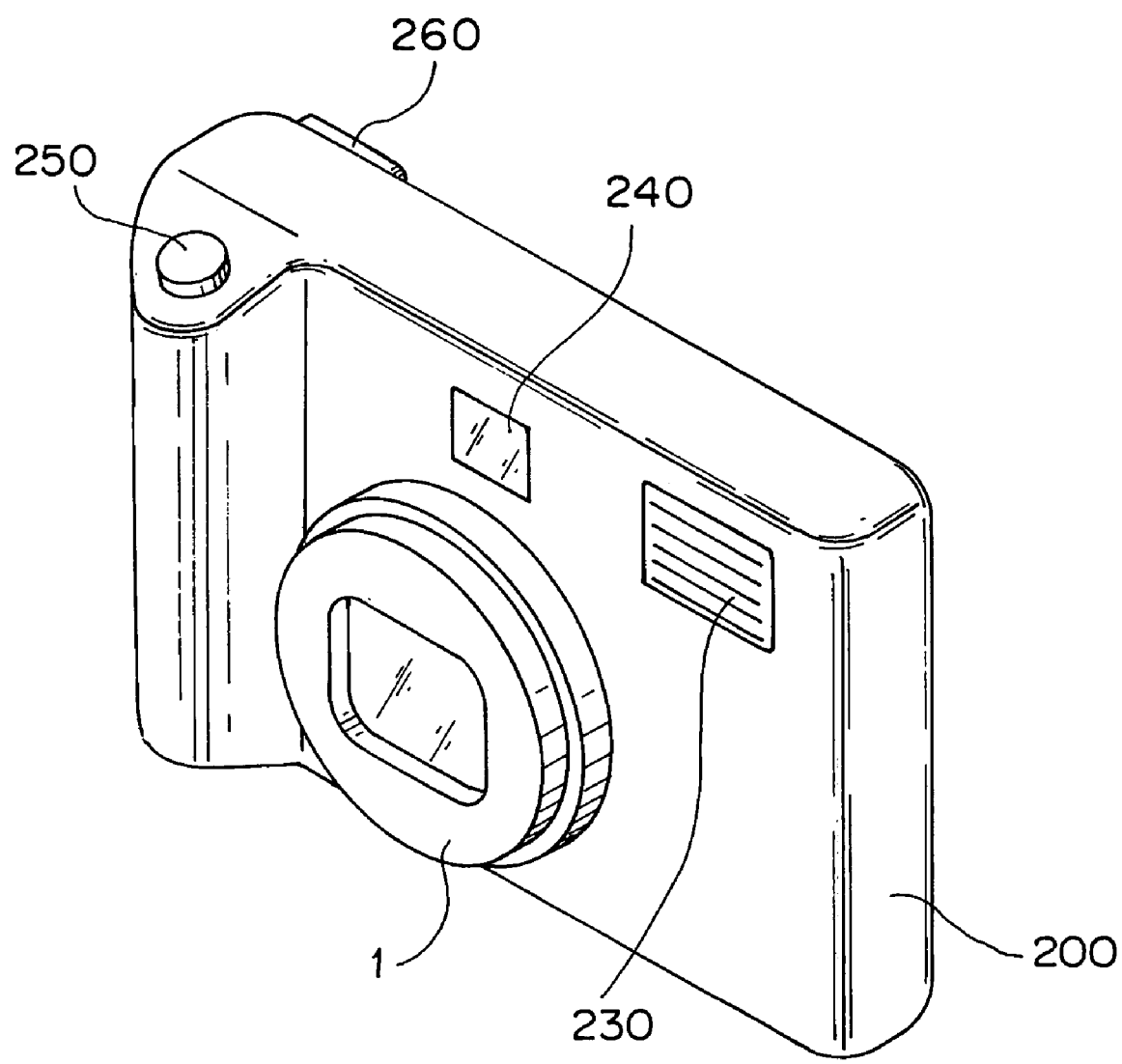
FIG. 8 is perspective view of a camera including the lens barrel illustrated in FIG. 1.

The structure of a camera body 200 including the above-described lens barrel 1 will now be described. FIG. 8 is a perspective view of a camera including the lens barrel 1, illustrated in FIG. 1.

As illustrated in FIG. 8, the lens barrel 1 is disposed at the center of the front of the camera body 200. A viewing window 240 for optically viewing an object is disposed above the lens barrel 1. A strobe window 230 for irradiating the object with strobe light is disposed diagonally upward to the right of the lens barrel 1.

A release button 250 for starting photographing is disposed to the left on the upper surface of the camera body 200. A zoom button 260 for zooming the lens barrel 1 to photograph the object at a predetermined magnification is disposed to the upper left on the back side of the camera body 200.

As described above, according to an embodiment of the present invention, the first barrier blades 70 are moved to the opened and closed positions by moving the cam surfaces 50c of the shafts 50b of the barrier-driving members 50 rotatably engaged with barrier shaft holes 37 of the linearly movable frame 30 and the pressing surfaces 40d1 of the pressing parts 40d provided in the optical axis forward direction of the float key 40 so that they come into contact with each other or move apart from each other.

The second barrier blades 80 are moved to the opened and closed positions in conjunction with the opening and closing movement of the first barrier blades 70 by engaging the blade driving pins 70d of the first barrier blades 70 with the long holes 80d of the second barrier blades 80.

In this way, the first and second barrier blades 70 and 80 can be opened and closed by employing a simple structure.

Accordingly, since various driving mechanisms for opening and closing the barrier blades are not required, the size of the lens barrel 1 can be reduced.

The shaft holes 70a of the first barrier blades 70 and the shaft holes 80a of the second barrier blades 80 are inserted into the barrier shafts 50a of the barrier-driving members 50.

As a result, the shaft holes 70a of the first barrier blades 70 and the shaft holes 80a of the second barrier blades 80 are formed along the same axis. Accordingly, since the first barrier blades 70 and the second barrier blades 80 do not require separate rotational shafts, the size of the lens barrel 1 can be reduced.

The spring storage spaces 50i for storing the barrier opening springs 110 are provided on the barrier-driving members 50. Since the barrier opening springs 110 are disposed on the rotational shafts of the first and second barrier blades 70 and 80, additional spaces for storing the barrier opening springs 110 are not required. Therefore, the size of the lens barrel 1 can be reduced.

The vicinity of each of the barrier opening springs 110 is substantially covered with the spring guide 50g. The spring guide 50g is disposed so that its end surface is in contact with the vicinity of the shaft hole 70a of each of the first barrier blades 70. Therefore, supports 110a (which are coils) of the barrier opening springs 110 are covered by the spring guides 50g and the first barrier blades 70. As a result, dust does not enter the supports 110a (which are coils) of the barrier opening springs 110 and opening and closing movements are carried out reliably.

The shaft 50b of each the barrier-driving members 50 is passed through the O-ring 55 and then rotatably inserted into the inner circumferential surface of the barrier shaft hole 37. Since the O-ring 55 keeps the inner circumferential surface of the barrier shaft hole 37 and the outer circumferential surface of the shaft 50b closely together in a water-tight manner, water and dust can be prevented from entering the linearly movable frame 30 by employing a simple structure.

To drive the lens barriers, the barrier-driving members 50 having a rotational axis parallel to the optical axis O are disposed wherein the shafts 50b of the barrier-driving members 50 are arranged inside the lens barrel attached to the inward flange 31. In other words, by disposing the mechanism for transmitting a driving force from inside the lens barrel 1 to the lens barriers along a rotational axis parallel to the optical axis O, a water-proof and dust-proof lens barrel 1 having a simple structure can be provided.

Since large driving units rotatable around the optical axis O do not have to be disposed on the barrier-driving members 50, the structure of the lens barrel 1 can be simplified and the size of the lens barrel 1 can be reduced. According to this embodiment, the light path of the photographic optical system is blocked by the pair of first barrier blades 70 opened and closed by the barrier-driving members 50 and the pair of second barrier blades 80 opened and closed in conjunction with the first barrier blades 70. The barrier blades according to the present invention are not limited to this, and the number of barrier blades may be increased or reduced.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A lens barrel comprising:
   a first frame including an inward flange having a central opening as a light path for a photographic optical system;
   a barrier-driving member disposed in the vicinity of the opening of the inward flange, the barrier-driving member being rotatable around an axis parallel with an optical axis of the photographic optical system;
   a second frame disposed inside the first frame and movable along an optical axis of the photographic optical system relative to the first frame, the second frame having a pressing part capable of pressing the barrier-driving member when the second frame moves relative to the first frame;
   a first barrier blade movable in cooperation with the rotation of the barrier-driving member between a closed position in which the first barrier blade blocks at least a part of the light path of the photographic optical system and an open position in which the first barrier blade is retracted from the light path of the photographic optical system;
   an opening-urging member disposed on the barrier-driving member, the opening-urging member being capable of urging the first barrier blade towards the open position and urging the barrier-driving member towards a first direction;
   a closing-urging member disposed in the vicinity of the opening of the inward flange, the closing-urging member urging the first barrier blade toward the closed position; wherein
   the barrier-driving member rotates in a second direction opposite to the first direction against the urging force of the opening-urging member as the pressing part presses the barrier-driving member,
   the first barrier blade moves from the open position to the closed position by the urging force of the closing-urging member when the pressing part presses the barrier-driving member, and,
   when the pressing part separates from the barrier-driving member, the barrier-driving member rotates in the first direction by the urging force of the opening-urging member and the first barrier blade moves from the closed position to the open position against the urging force of the closing-urging member.

2. The lens barrel according to claim 1, wherein
   the second frame is capable of moving to a first position and a second position relative to the first frame,
   the pressing part comes into contact with the barrier-driving members and presses the barrier-driving member when the second frame is at the first position, and
   the pressing part separates from the barrier-driving member when the second frame is at the second position.

3. The lens barrel according to claim 1 further comprising a water-proof member for maintaining water-tightness between the barrier-driving member and the first frame.

4. The lens barrel according to claim 1 further comprising a second barrier blade capable of moving between an open position and a closed position in conjunction with the first barrier blade.

5. The lens barrel according to claim 1 further comprising:
   a shaft hole portion provided on the first barrier blade, the shaft hole portion having a shaft hole; and
   a barrier shaft provided on the barrier-driving member, the barrier shaft being engaged with the shaft hole of the shaft hole portion and functioning as a rotational shaft for the first barrier blade;

wherein the opening-urging member is a torsion spring, the torsion spring extending through the barrier shaft.

6. The lens barrel according to claim 1 further comprising:
a shaft hole portion provided on the first barrier blade, the shaft hole portion having a shaft hole;
a barrier shaft provided on the barrier-driving member, the barrier shaft being engaged with the shaft hole of the shaft hole portion and functioning as a rotational shaft for the first barrier blade; and
a sidewall provided on the barrier-driving member, the sidewall surrounding the barrier shaft;
wherein the first barrier blade is in contact with the end part in the optical axis forward direction of the sidewall.

7. The lens barrel according to claim 6 wherein the opening-urging member is a torsion spring, the torsion spring being attached to the barrier shaft.

8. The lens barrel according to claim 7 wherein at least a coiled portion of the torsion spring is covered by the first barrier blade and the sidewall while the first barrier blade is attached to the barrier-driving member.

9. The lens barrel according to claim 8 wherein an arm insertion part for passing through an arm of the torsion spring is provided on the sidewall.

10. The lens barrel according to claim 9 wherein the arm of the torsion spring contacts the edge of the arm insertion part while the arm of the torsion spring is passed through the arm insertion part.

11. A lens barrel comprising:
a first frame including an inward flange having a central opening as a light path for a photographic optical system;
a second frame disposed inside the first frame and movable along an optical axis of the photographic optical system relative to the first frame;
a guide disposed on the second frame;
a rotation stopper disposed on the first frame, the rotation stopper engaging with the guide to restrict rotation of the first frame around the optical axis relative to the second frame;
a barrier-driving member disposed in the vicinity of the opening of the inward flange, the barrier-driving member being rotatable around an axis parallel with the optical axis of the photographic optical system;
a pressing part disposed on the second frame, the pressing part being capable of moving between a position apart from the barrier-driving member and a position being in contact with and applying pressure to the barrier-driving members, in response to the relative movement of the first frame and the second frame;
a first barrier blade movable along with the rotation of the barrier-driving member between a closed position in which the first barrier blade blocks at least a part of the light path of the photographic optical system and an open position in which the first barrier blade is retracted from the light path of the photographic optical system;
an opening-urging member capable of urging the first barrier blade towards the open position and urging the barrier-driving member towards a first direction;
a closing-urging member disposed in the vicinity of the opening of the inward flange, the closing-urging member urging the first barrier blade toward the closed position; wherein
the barrier-driving member rotates in a second direction opposite to the first direction against the urging force of the opening-urging member as the pressing part presses the barrier-driving member,
the first barrier blade moves from the open position to the closed position by the urging force of the closing-urging member as the pressing part presses the barrier-driving member, and,
as the pressing part separates from the barrier-driving member, the barrier-driving member rotates in the first direction by the urging force of the opening-urging member and the first barrier blade moves from the closed position to the open position against the urging force of the closing-urging member.

12. The lens barrel according to claim 11 wherein the position of the guide relative to the circumference of the second frame is in the vicinity of the position of the pressing part relative to the circumference of the second frame.

13. The lens barrel according to claim 12 further comprising:
a third frame having a thrust position-restricting portion for restricting the movement of the second frame along the optical axis; and
an engagement portion disposed on the second frame, the engagement portion engaging with the thrust position-restricting portion.

14. The lens barrel according to claim 13 wherein the positions of the guide and the engagement portion relative to the circumference of the second frame are in the vicinity of the position of the pressing part relative to the circumference of the second frame.

15. The lens barrel according to claim 11 further comprising:
a third frame having a thrust position-restricting portion for restricting the movement of the second frame along the optical axis; and
an engagement portion disposed on the second frame, the engagement portion engaging with the thrust position-restricting portion.

16. The lens barrel according to claim 15 wherein the position of the engagement portion relative to the circumference of the second frame is in the vicinity of the position of the pressing part relative to the circumference of the second frame.

17. A camera having a lens barrel comprising:
a first frame including an inward flange having a central opening as a light path for a photographic optical system;
a barrier-driving member disposed in the vicinity of the opening of the inward flange, the barrier-driving member being rotatable around an axis parallel with an optical axis of the photographic optical system;
a second frame disposed inside the first frame and movable along an optical axis of the photographic optical system relative to the first frame, the second frame having a pressing part capable of pressing the barrier-driving member when the second frame moves relative to the first frame;
a first barrier blade movable along with the rotation of the barrier-driving member between a closed position in which the first barrier blade blocks at least a part of the light path of the photographic optical system and an open position in which the first barrier blade is retracted from the light path of the photographic optical system;
an opening-urging member disposed on the barrier-driving member, the opening-urging member being capable of urging the first barrier blade towards the open position and urging the barrier-driving member towards a first direction;

a closing-urging member disposed in the vicinity of the opening of the inward flange, the closing-urging member urging the first barrier blade toward the closed position; wherein the barrier-driving member rotates in a second direction opposite to the first direction against the urging force of the opening-urging member as the pressing part presses the barrier-driving member, the first barrier blade moves from the open position to the closed position by the urging force of the closing-urging member as the pressing part presses the barrier-driving member, and, as the pressing part separates from the barrier-driving member, the barrier-driving member rotates in the first direction by the urging force of the opening-urging member and the first barrier blade moves from the closed position to the open position against the urging force of the closing-urging member.

18. The camera according to claim 17, wherein the lens barrel is retractable, and the pressing part is in contact with the barrier-driving member when the lens barrel is retracted.

19. The camera according to claim 17 further comprising:

a shaft hole portion provided on the first barrier blade, the shaft hole portion having a shaft hole; and a barrier shaft provided on the barrier-driving member, the barrier shaft being engaged with the shaft hole of the shaft hole portion and functioning as a rotational shaft for the first barrier blade;

wherein the opening-urging member is a torsion spring, the torsion spring being inserted into the shaft part of the barrier shaft.

20. The camera according to claim 17 further comprising:

a shaft hole portion provided on the first barrier blade, the shaft hole portion having a shaft hole;

a barrier shaft provided on the barrier-driving member, the barrier shaft being engaged with the shaft hole of the shaft hole portion and functioning as a rotational shaft for the first barrier blade; and a sidewall provided on the barrier-driving member, the sidewall surrounding the barrier shaft;

wherein the first barrier blade is in contact with the end part in the optical axis forward direction of the sidewall.

* * * * *